(12) United States Patent
Suzuki et al.

(10) Patent No.: US 8,193,282 B2
(45) Date of Patent: Jun. 5, 2012

(54) THERMOPLASTIC RESIN COMPOSITION

(75) Inventors: Masami Suzuki, Hiratsuka (JP); Morio Tsunoda, Hiratsuka (JP); Hajime Ohyama, Hiratsuka (JP); Makoto Nakamura, Hiratsuka (JP); Kiyoji Takagi, Hiratsuka (JP)

(73) Assignee: DSM IP Assets B.V., Heerlen (NL)

( * ) Notice: Subject to any disclaimer, the term of this patent is extended or adjusted under 35 U.S.C. 154(b) by 1149 days.

(21) Appl. No.: 11/635,798

(22) Filed: Dec. 8, 2006

(65) Prior Publication Data

US 2007/0117901 A1    May 24, 2007

Related U.S. Application Data

(63) Continuation-in-part of application No. PCT/JP2005/012683, filed on Jul. 8, 2005.

(30) Foreign Application Priority Data

Jul. 12, 2004  (JP) ................. 2004-204864
Jul. 12, 2004  (JP) ................. 2004-204865

(51) Int. Cl.
*C08K 3/04* (2006.01)
*C08K 3/34* (2006.01)
*C08L 53/02* (2006.01)
*C08L 77/00* (2006.01)

(52) U.S. Cl. .......................... 525/66; 525/89
(58) Field of Classification Search .......... 525/66, 525/89

See application file for complete search history.

(56) References Cited

U.S. PATENT DOCUMENTS

| | | | | |
|---|---|---|---|---|
| 5,070,143 | A * | 12/1991 | Pucci et al. | 525/74 |
| 2002/0177672 | A1 * | 11/2002 | Matsuoka et al. | 525/416 |
| 2006/0083854 | A1 * | 4/2006 | Ober et al. | 427/240 |

FOREIGN PATENT DOCUMENTS

| | | |
|---|---|---|
| JP | 7-26019 | 1/1995 |
| JP | 11-80482 | 3/1999 |
| JP | 2002-105343 | 4/2002 |
| JP | 2000-345032 | 12/2002 |
| JP | 2003-64254 | 3/2003 |
| JP | 2003-64255 | 3/2003 |
| JP | 2003-238800 | 8/2003 |
| JP | 2004-331766 | 11/2004 |

OTHER PUBLICATIONS

Takagi et al., electronic translation of specification of JP 2003-064254, Mar. 2003.*
Takagi et al. electronic translation of specification of JP 2004-331766, Nov. 2004.*
International Search Report for PCT/JP2005/012683 mailed Sep. 6, 2005.

* cited by examiner

*Primary Examiner* — Jeffrey Mullis
(74) *Attorney, Agent, or Firm* — Nixon & Vanderhye P.C.

(57) ABSTRACT

The present invention relates to a thermoplastic resin composition which excels in impact resistance, dimension stability and rigidity, and also excels in appearance, fluidity and paint film adhesion property, and further which is very useful as manufacturing materials for exterior parts of automobile.
A thermoplastic resin composition comprising
  component (A): a polyamide resin;
  component (B): a hydrogenated product of block copolymer comprising vinyl aromatic polymer block (a) and conjugated diene based polymer block (b), and/or ethylene-α-olefin based block copolymer;
  component (C): a modified hydrogenated product of block copolymer comprising the vinyl aromatic polymer block (a) and the conjugated diene based polymer block (b), which hydrogenated product is modified by addition of an unsaturated acid and/or derivative thereof;
  component (D): a plate-like and/or needle-like inorganic filler; and
  component (F): an ethylene-vinyl alcohol copolymer and/or a partial saponified product of ethylene-vinyl acetate copolymer.

22 Claims, No Drawings

THERMOPLASTIC RESIN COMPOSITION

CROSS REFERENCES TO RELATED APPLICATIONS

This is a continuation-in-part application of International Application No. PCT/JP2005/012683, filed 8 Jul. 2005, which designated the US and claims benefit of JP 2004-204864, filed 12 Jul. 2004 and JP 2004-204865, filed 12 Jul. 2004, the entire contents of each of which are hereby incorporated by reference.

BACKGROUND OF THE INVENTION

The present invention relates to a thermoplastic resin composition which excels especially in impact resistance, dimension stability and rigidity, and also excels in appearance, fluidity and paint film adhesion property, and further which is widely used for various technical fields such as electric machines, electronics and automobile. Especially, the thermoplastic resin composition is extremely useful as manufacturing materials for exterior parts of automobile.

Since polyamide resins are excellent in mechanical properties such as moldability, chemical resistance, tensile strength and bending strength, and also abrasion resistance, polyamide resins are widely used in various technical fields such as electric machine parts, electronics parts, machine parts and automobile parts. However, there is a problem of poor dimension stability (linear expansion coefficient) in obtained molded products. For example, in case where a molded product obtained from a polyamide resin composition is used with a metallic part in combination, there are problems of dimension difference therebetween and engagement trouble therebetween when using under high temperature circumstance, because the linear expansion coefficient of the resin molded part is larger than that of metallic parts.

Further, in case where paint is applied on a surface of plastic molded product and this plastic molded product is used under high temperature circumstance, the formed paint film on the surface of molded product is peeled off or fine cracks are formed on the paint film surface so that there arise problems of deterioration of appearance and design thereof, because of difference of expansion coefficient between the paint and plastic molded product.

On the other hand, it has been progressed to use plastic materials for exterior automobile parts such as fenders, door panels, bonnets and roof panels, which are generally formed with metallic materials in view of enabling lightening, design variety and module assembling. In these applications, there are required materials having high level quality of impact resistance, dimension stability (linear expansion coefficient), rigidity, fluidity, appearance, etc.

As a method for improving the dimension stability and rigidity of polyamide resin, there has been known a method in which an inorganic filler is blended into a polyamide resin. However, in this method, there is a problem that the application field is limited because the impact resistance is remarkably deteriorated and also the appearance is deteriorated.

As an improvement strategy of the above problem, for example, in order to improve the impact resistance of polyamide resin, it is widely used to add a rubber polymer thereinto. Further, in order to enhance the compatibility between the polyamide resin and rubber polymer, it is known as a conventional manner to modify the rubber polymer with an unsaturated carboxylic acid or derivative thereof.

For example, as the above polyamide resin composition, there is disclosed a composition comprising polyamide resin and modified hydrogenated block copolymer and also described that an inorganic filler can be blended as an optional component thereinto (refer to Patent Document 1). Further, there is disclosed a polyamide resin composition which comprises a polyamide resin, an inorganic filler, modified styrene-olefin based copolymer and has excellent metal plating property and paint film adhesion property (refer to Patent Document 2). However, in the above conventional techniques, the balance of impact resistance, dimension stability and rigidity is insufficient. To this matter, for example, in order to improve the impact resistance, the blending content of rubber polymer is increased. However, since the dimension stability and rigidity are remarkably deteriorated by increasing blending content of rubber polymer, it is necessary to improve the balance of impact resistance, dimension stability and rigidity.

Still further, there is disclosed a polyamide resin composition which comprises (A) polyamide resin, (B) hydrogenated block copolymer comprising-block "a" of vinyl aromatic compound polymer and block "b" of olefin compound polymer and (C) modified block copolymer obtained by addition of carboxylic acid or derivative group thereof to the above hydrogenated block copolymer, has an excellent impact resistance and a good property balance of elasticity, heat resistance and weld portion strength, and is improved in moldability and appearance of molded product (refer to Patent document 3). Also, there is disclosed a polyamide resin composition which comprises (A) polyamide resin having specific end groups, (B) hydrogenated block copolymer comprising a vinyl aromatic compound and conjugated diene compound, (C) modified block copolymer obtained by bonding carboxylic acid group or derivative group thereof to a hydrogenated block copolymer comprising a vinyl aromatic compound and conjugated diene compound, (D) ethylene-α-olefin based copolymer and (E) olefin based polymer having acid anhydride group at the only chain end, and is improved in low temperature impact resistance (refer to Patent document 4). In this reference, there is a further description that an inorganic filler can be added as an optional component into these compositions.

However, in these inventions, there is an only disclosure of blending effect of the inorganic filler within the combination of the above specific components and no concrete embodiment of blending the inorganic filler in Examples. Therefore, there is no description nor suggestion that it is necessary to blend a specific inorganic filler in order to obtain a polyamide resin composition having an extremely good balance of impact resistance, dimension stability and rigidity.

Further, there is disclosed an impact resistance polyamide resin composition comprising a polyamide resin, a functioned (acid modified) triblock copolymer, an unfunctioned ethylene-propylene copolymer and a fibrous filler (refer to Patent document 5). However, in this invention, there is a problem of deterioration of appearance of obtained molded product caused by using the fibrous filler. Further, in this reference, there is no teaching that it is necessary to blend a specific inorganic filler thereinto in order to attain good appearance while maintaining the high level balance of impact resistance, dimension stability and rigidity. Therefore, there is a strong demand to provide a thermoplastic resin composition having excellent balance of impact resistance, dimension stability and rigidity as well as good appearance.

Still further, in Patent document 6, there is disclosed a composition comprising (A) polyamide resin, (B) copolymer of olefin based compound and compound having an unsaturated group and together with polar group typically such as ethylene-acrylic acid copolymer and (C) conductive material, and which composition is excellent in mechanical properties, fluidity and electrical properties such as conductivity.

To the said composition, the present inventor has further studied to obtain a molding product having good appearance by preventing from a problem that not good marks formed at releasing remain to the surface of molding product by improvement of releasability when molding.

Patent document 1: Japanese Patent Publication (KOKOKU) No. 63-44784
Patent document 2: Japanese Patent Publication (KOKOKU) No. 8-11782
Patent document 3: Japanese Patent Publication (KOKOKU) No. 7-26019
Patent document 4: Japanese Patent No. 3330398
Patent document 5: Japanese Patent Publication (KOKOKU) 7-49522
Patent document 6: Japanese Patent Application Laid-Open (KOKAI) No. 2003-64254

SUMMARY OF THE INVENTION

An object of the present invention is to provide a thermoplastic resin composition which is solved in the above problems in the prior arts, shows good chemical resistance and heat resistance, is improved in dimension stability by reducing the linear expansion coefficient so that there is no problem when used with a metallic part in combination, and is excellent in impact resistance, rigidity and appearance. Further, the other object is to provide a thermoplastic resin composition having excellent adhesion property for a paint film coated on the surface thereof by a conductive painting.

As a result of the present inventors' earnest study to attain the above object, it has been found that the following composition is excellent in dimension stability, rigidity, impact resistance and appearance together. The present invention has been attained on the basis of the above finding. Especially, it has been found that the heat resistance and appearance (especially surface planarity) are remarkably excellent simultaneously by blending a specific inorganic filler and ethylene-vinyl alcohol copolymer and/or a partial saponified product of ethylene-vinyl acetate copolymer in a specific amount.

Thus, in the first aspect of the present invention, there is provided a thermoplastic resin composition comprising
component (A): a polyamide resin;
component (B): a hydrogenated product of block copolymer comprising vinyl aromatic polymer block (a) and conjugated diene based polymer block (b), and/or an ethylene-α-olefin based block copolymer;
component (C): a modified hydrogenated product of block copolymer comprising the vinyl aromatic polymer block (a) and the conjugated diene based polymer block (b), which hydrogenated product is modified by addition of an unsaturated acid and/or derivative thereof in an amount of 0.3 to 2.5 parts by weight based on 100 parts of hydrogenated product of block copolymer;
component (D): a plate-like and/or needle-like inorganic filler having an average particle size of not more than 8 μm; and
component (F): an ethylene-vinyl alcohol copolymer and/or a partial saponified product of ethylene-vinyl acetate copolymer, a weight ratio of component (A)/components ((B)+(C)) being 90/10 to 60/40,
a weight ratio of component (B)/component (C) being 10/90 to 90/10,
an amount of component (D) being 5 to 60 parts by weight based on 100 parts by weight of total amount of component (A), (B) and (C), and
an amount of component (F) being 0.5 to 20 parts by weight based on 100 parts by weight of total amount of component (A), (B), (C), and (D).

Moreover, the thermoplastic resin composition according to the present invention may contain a specific electroconductive filler.

Thus, in the second aspect of the present invention, there is provided a thermoplastic resin composition comprising
component (A): a polyamide resin;
component (B): a hydrogenated product of block copolymer comprising vinyl aromatic polymer block (a) and conjugated diene based polymer block (b), and/or ethylene-α-olefin based block copolymer;
component (C): a modified hydrogenated product of block copolymer comprising the vinyl aromatic polymer block (a) and the conjugated diene based polymer block (b), which hydrogenated product is modified by addition of an unsaturated acid and/or derivative thereof in an amount of 0.3 to 2.5 parts by weight based on 100 parts by weight of hydrogenated product of block copolymer;
component (D): a plate-like and/or needle-like inorganic filler having an average particle size of not more than 8 μm;
component (E): a conductive carbon black and/or hollow carbon fibril; and
component (F): an ethylene-vinyl alcohol copolymer and/or a partial saponified product of ethylene-vinyl acetate copolymer,
a weight ratio of component (A)/components ((B)+(C)) being 90/10 to 60/40,
a weight ratio of component (B)/component (C) being 10/90 to 90/10,
an amount of component (D) being 5 to 60 parts by weight based on 100 parts by weight of total amount of components (A), (B) and (C),
an amount of component (E) being 1 to 15 parts by weight based on 100 parts by weight of component, and
an amount of component (F) being 0.5 to 20 parts by weight based on 100 parts by weight of total amount of components (A), (B), (C), (D) and (E).

Since the thermoplastic resin composition according to the present invention is excellent in balance of impact resistance, dimension stability and rigidity, and also excellent in appearance, it is widely used for various technical fields such as electric & electronic machine parts, machine parts and automobile parts, especially extremely useful as manufacturing materials for exterior parts of automobile. Further, since the thermoplastic resin composition according to the present invention is excellent in paint film adhesion property as well as conductivity, it is especially effective to conduct electrostatic painting to large-scale molding products comprising the composition.

Especially, by blending the component (F): the specific inorganic filler and ethylene-vinyl alcohol copolymer and/or a partial saponified product of ethylene-vinyl acetate copolymer, the paint film adhesion property of the surface of molded product comprising the said composition is remarkably improved without deteriorating the melt fluidity and releasability of the composition.

DETAILED DESCRIPTION OF THE INVENTION

The present invention is explained in detail as follows.
<Polyamide Resin>
The polyamide resin of component (A) used in the thermoplastic resin composition according to the present invention is an aliphatic polyamide resin which is capable of heat-melting and has —CONH— bond in the main chain. Typical examples of the polyamide resin include nylon-4, nylon-6, nylon-6•6, nylon-4•6, nylon-12, nylon-6•10, polyamide resins comprising a known diamine and dicarboxylic acid as the monomer components. Preferable polyamide resins are nylon-6 and nylon-6•6.

The polyamide resin of the component (A) preferably has a 2.1 to 3.5 of relative viscosity of 1 wt % solution thereof in 98 wt % concentrated sulfuric acid at 23° C. When the relative viscosity is less than 2.1, there may be a possibility that rigidity, dimension stability, impact resistance and appearance deteriorate. When the relative viscosity is more than 3.5, moldability tends to deteriorate and there may be a possibility of deterioration of appearance. The concentration of terminal carboxyl group of polyamide resin is preferably not more than 100 µeq/g. The ratio of terminal carboxyl group content to terminal amino group content (terminal carboxyl group content/terminal amino group content) is preferably 0.8 to 4. When the said ratio is less than 0.8, the fluidity may be deteriorated and the appearance thereof may be insufficient. When the said ratio is more than 4, there may be a possibility that the impact resistance and rigidity are deteriorated.

<Hydrogenated Product of Block Copolymer>

The hydrogenated product of block copolymer used as the components (B) and (C) of thermoplastic resin composition according to the present invention is a block copolymer comprising vinyl aromatic polymer block (a) and conjugated diene based polymer block (b), in which the number of aliphatic unsaturated bond in the block (b) has been mainly reduced by hydration.

The hydrogenated products of block copolymer of component (B) and block copolymer of component (C) may be identical or different and the hydrogenated products of block copolymer of component (B) is not modified with functional groups. The construction structure of blocks (a) and (b) may be linear structure or graft structure (radial tere-block). In these structures, there may be partially contained a random chain derived from a random polymerized part of vinyl aromatic compound and conjugated diene based compound. In the above structures, the linear structure is preferred and (a)-(b)-(a) type triblock structure is especially preferred, in which (a)-(b) type diblock structure may be contained.

The vinyl aromatic compound monomer constituting the block (a) of vinyl aromatic compound polymer of components (B) and (C) is preferably styrene, α-methylstyrene, para-methylstyrene, vinyltoluene and vinylxylene, more preferably styrene. The conjugated diene based compound monomer constituting the block (b) of conjugated diene based polymer is preferably 1,3-butadiene and 2-methyl-1,3-butadiene.

The content of repeating unit derived from the vinyl aromatic compound in the hydrogenated product of block copolymer is preferably 10 to 70% by weight, more preferably 10 to 40% by weight. As the unsaturated bond in the hydrogenated product of block copolymer, the percentage of remaining bonds which have been not hydrogenated in the aliphatic unsaturated bonds derived from the conjugated diene compound, is preferably not more than 20%, more preferably not more than 10%. Further, the aromatic unsaturated bonds derived from the vinyl aromatic compound may be hydrogenated in an amount of about not more than 25%.

As the above hydrogenated product of block copolymer, in case where the conjugated diene compound-based monomer which constitutes block (b) of conjugated diene compound-based polymer is 1,3-butadiene, the product is named as styrene-ethylene/butylene-styrene copolymer (SEBS), and in case where the said monomer is 2-methyl-1,3-butadiene, styrene-ethylene/propylene-styrene copolymer (SEPS). These are easily available as various commercial products having (a)-(b)-(a) triblock type structure.

The number average molecular weight of hydrogenated product of block copolymer in these components (B) and (C) is preferably not more than 180,000, more preferably not more than 120,000. When the number average molecular weight is more than 180,000, the mold processability tends to deteriorate and the appearance may be deteriorated.

<Ethylene-α-Olefine Based Copolymer>

The ethylene-α-Olefine based copolymer of component (B) used in the thermoplastic resin composition according to the present invention is rubber like copolymer comprising ethylene and α-olefine as essential components, which copolymer is not modified with any functional group. The copolymerizing ratio of ethylene to α-olefine (by weight) is usually 90:10 to 20:80, preferably 75:25 to 40:60.

The α-olefine used for copolymerization is an unsaturated hydrocarbon compound having 3 to 20 carbon number. The concrete examples of α-olefine are propylene, 1-butene, 1-pentene, 1-hexene, 1-octene, 1-decene, 3-methylbutene-1 and 4-methylpentene-1. Of these, α-olefines having straight chain and 3 to 10 carbon number are preferred, propylene, 1-butene and 1-octene are especially preferred.

Further, as the ethylene-α-Olefine based copolymer of component (B) used in the thermoplastic resin composition according to the present invention, there can be used such a copolymer that unsaturated bonds are introduced by copolymerizing a diene compound besides ethylene and the above α-olefine. The types of diene compound used in the above copolymerization are alkenylnorbornenes, cyclic dienes and aliphatic dienes, preferably 5-ethylidene-2-norbornene and dicyclopentadiene.

The ethylene-α-Olefine based copolymers has a melt flow rate (MFR) measured by ASTM-D1238 at 230° C. under loading of 2.16 kg, of preferably 0.05 to 150 g/10 minutes, more preferably 0.1 to 50 g/10 minutes. When the MFR is less than 0.05, the mold processsability tends to deteriorate. When the MFR is 150 or more, the impact resistance may be deteriorated.

<Modified Hydrogenated Product of Block Copolymer>

As the graft modifier, unsaturated acid and/or derivative thereof in order to obtain the modified hydrogenated product of block copolymer of component (C) used in the thermoplastic resin composition according to the present invention, the concrete examples of unsaturated acid may include α,β-unsaturated carboxylic acids such as acrylic acid, methacrylic acid, maleinic acid, fumaric acid, tetrahydrophthalic acid, itaconic acid, cytraconic acid, crotonic acid and najic acid. As to the derivative thereof, there are exemplified acid anhydrides, acid halides, amides, imides and esters of respective above unsaturated acids. Concretely, there are exemplified maleyl chloride, maleimide, maleic anhydride, itaconic anhydride, citraconic anhydride, monomethyl maleate and dimethyl maleate.

Of these, unsaturated dicarboxylic acids or anhydrides thereof are preferred, maleic acid, itaconic acid and anhydrides thereof are especially preferred. These unsaturated dicarboxylic acids and anhydrides thereof may be used either individually or as a combination of two or more.

In the component (C), the addition amount of the unsaturated dicarboxylic acid and/or anhydride thereof which is added to modified block copolymer is 0.3 to 5.0 parts by weight based on 100 parts by weight of hydrogenated product of block copolymer. When the addition amount is less than 0.3 parts by weight, the impact strength of thermoplastic resin composition may be deteriorated. When the addition amount is more than 5 parts by weight, the dimension stability and fluidity thereof may be deteriorated. Therefore, it is not preferable.

In order to obtain the modified hydrogenated block copolymer effectively by adding the above graft modifier, unsaturated acid and/or derivative thereof to the above hydrogenated product of block copolymer of component (C), it is preferred to use a radical generator. As to the radical generator, there can be exemplified organic peroxides and azo compounds.

Concrete examples of organic peroxides may include (1) hydroperoxides such as t-butyl-hydroperoxide, cumene-hydroperoxide, 2,5-dimethylhexane-2,5-dihydroperoxide, 1,1,3,3-tetramethylbutyl-hydroperoxide, p-menthane-hydroperoxide and diisopropylbenzene-hydroperoxide; (2) di-alkylperoxides such as 2,5-dimethyl-2,5-di(t-butylperoxy)hexine-3, di-t-butyl-peroxide, t-butyl-cumyl-peroxide, 2,5-dimethyl-2,5-di(t-butylperoxy)hexane and dicumyl peroxide; (3) peroxyketals such as 2,2-bis-t-butylperoxy-octane, 2,2-bis-t-butyl-peroxy-octane, 1,1-bis-t-butylperoxy-cyclohexane and 1,1-bis-t-butylperoxy-3,3,5-trimethylcyclohexane; (4) peroxyesters such as di-t-butylperoxyisophthalate, t-butylperoxybenzoate, t-butylperoxyacetate, 2,5-di-methyl-2,5-di-benzoylperoxy-hexane, t-butylperoxyisopropyl carbonate and t-butylperoxyisobutylate; (5) diacylperoxides such as benzoylperoxide, m-toluoylperoxide, acetylperoxide and lauloylperoxide; etc.

Concrete examples of azo compounds may include 2,2'-azobisisobutylonitrile, 2,2'-azobis(2-methylbutylonitrile), 1,1'-azobis(cyclohexane-1-carbonitrile), 1-[(1-cyano-1-methylethyl)azo]formamide, 2,2'-azobis(2,4,4-trimethylpentane), 2,2'-azobis(2-methylpropane), etc.

As the other radical generator, dicumyl may be mentioned.

In the above radical generators, a radical generator having such a property that the half-life period temperature for 10 hours is not lower than 120° C. is especially preferred. When using a radical generator having the half-life period temperature of lower than 120° C., it is not preferred in view of the dimension stability and impact resistance.

<Inorganic Filler>

In the present invention, the shape of inorganic filler is clearly distinguished by spherical shape, platy shape, needle-like shape and fibrous shape as follows.

The spherical shape means not only a complete spherical form but also a somewhat elliptical form and a shape whose aspect ratio is nearly 1. The platy shape means a plate-like form whose aspect ratio (maximum length of platy surface in the platy particle/thickness of the platy particle) is 2 to 100. The needle-like shape means a form whose length is not more than 100 μm and whose aspect ratio is 2 to 20. The fibrous shape means a form whose length exceed 100 μm. These shapes are easily distinguished by use of electron microscope photograph technique.

The inorganic filler of component (D) used in the thermoplastic resin composition according to the present invention is a platy shape and/or needle shape filler having an average particle size of not more than 8 μm, excepting for the fibrous shape filler such as glass fiber and carbon fiber and spherical shape filler such as silica, glass beads and carbon black. When using fibrous shape inorganic filler, the appearance of final molded product is deteriorated. When using spherical shape inorganic filler, the dimension stability and rigidity of final molded product are poor. Therefore, these are not preferable.

Concrete examples of platy shape filler may include magnesium silicate such as talc, clay, mica, graphite, sericite, montmorilonite, platy calcium carbonate, platy alumina and glass flake. Concrete examples of needle shape filler may include calcium silicate such as wollastonite, Mos Hige, xonotlite, calcium titanate, aluminium borate, needle shape calcium carbonate, needle shape titanium oxide and tetra-pot shape zinc oxide.

Of these inorganic fillers, magnesium silicate and calcium silicate are preferred in view of balance of impact resistance, dimension stability, rigidity and appearance, talc and wollastonite are especially preferred. The inorganic filler (D) may be used either individually or as a combination of two or more.

Incidentally, the "average particle size" in the present invention means "D50" measured by liquid phase sedimentation method by X-ray transmission. In case of the platy shape filler, the average particle size is defined as an average of plate width and length selected in the plate width, length and thickness. In case of the needle shape filler, the average particle size is defined as the diameter of needle. As the concrete measurement apparatus for the above size, there may be exemplified Sedigraph particle size analyzer (model 5100, manufactured by Micromeritics Instruement CO., Ltd.).

Thus, in order to obtain the final molded product by using the thermoplastic resin composition according to the present invention, having improved dimension stability and rigidity and having good appearance, it is required that the average particle size measured by the above method is not more than 8 μm, preferably not more than 5 μm. It is more preferably to use magnesium silicate and/or calcium silicate having the average particle size of not more than 5 μm, especially preferably to use magnesium silicate and/or calcium silicate having the average particle size of not more than 4 μm.

The magnesium silicate preferably used in the present invention is an indeterminated form platy crystal obtained by fine-pulverizing talc, the chemical composition thereof is magnesium silicate containing water, usually comprises 58 to 66% by weight of $SiO_2$, 28 to 35% by weight of MgO and about 5% by weight of water, and usually it is named as "talc". As the other minor components, 0.03 to 1.2% by weight of $Fe_2O_3$, 0.05 to 1.5% by weight of $Al_2O_3$, 0.05 to 1.2% by weight of CaO, not more than 0.2% by weight of $K_2O$, not more than 0.2% by weight of $Na_2O$, etc. are contained therein. The density thereof is about 2.7 and the aspect ratio thereof is usually 5 to 20.

The calcium silicate preferably used in the present invention is a white natural mineral having needle shape crystal whose chemical formula is $CaSiO_3$, usually comprises 50% by weight of $SiO_2$, 47% by weight of CaO and as minor components $Fe_2O_3$ and $Al_2O_3$. The density thereof is 2.9. The inorganic filler whose main component is anhydride calcium silicate salt is named as "wollastonite". As to the commercial products thereof, there may be exemplified "PH330" and "PH450" manufactured by Kawatetsu Mineral Co., Ltd., "Nigloss 4", "Nigloss 5" manufactured by Nico Co., Ltd. The average aspect ratio is preferably 3 to 20.

The above inorganic filler may be used as it is, but in order to enhance the affinity to the resin components or adhering strength to the surface thereof, it is preferable to use an inorganic filler treated with an inorganic surface treatment agent, higher aliphatic acid or derivative thereof such as ester salts, coupling agents, etc. It is more preferable to conduct any treatment with a surfactant such as various type nonionic, cationic and anionic surfactants or a dispersant such as various type resins together with conducting the above surface treating in view of improvement of mechanical strength and kneeding ability.

<Conductive Carbon Black and/or Hollow Carbon Fibril>

In the present invention, in order to provide conductivity to the thermoplastic resin composition comprising the above components (A), (B), (C), (D) and the following explained component (F), the conductive carbon black and/or hollow carbon fibril as the component (E) may be contained therein. These conductive agents are preferably used in view of a balance of conductivity and impact resistance.

As the conductive carbon black, it is preferable in view of conductivity to use a carbon black whose diputylphthalate oil absorption is not less than 200 ml/100 g, more preferably not less than 300 ml/100 g measured according to ASTM D2414. The carbon black having the above properties is a carbon black having a morphology of continuing fine particles which is different from that in a carbon black used for a pigment added to paints for coloring thereof. Preferable examples of conductive carbon black may include acetylene black obtained by thermal decomposition of acetylene and Ketchen black produced by incomplete combustion process of furnace type using a crude oil as a raw material.

The hollow carbon fibril is essentially a column shape fibril comprises an outside part comprising essentially continuous multi-layers of orderly arranged carbon atoms and an inside hollow part, in which each layer and hollow part are substantially arranged as a concentric circle. Further, in the above hollow carbon fibril, it is preferable that the orderly arranged carbon atoms in the continuous multi-layers have a graphite shape and the diameter of the above hollow part is 2 to 20 nm. Such hollow carbon fibril is described in detail in Japanese Patent Application laid-open (KOHYO) 62-500943 and U.S. Pat. No. 4,663,230. The process of production thereof which is described in U.S. Pat. No. 4,663,230 comprises contacting a particle containing a transition metal which comprises an aluminum support and contains a transition metal such as iron, cobalt and nickel with a carbon atom containing gas such as carbon monoxide and hydrocarbon at a high temperature of 850 to 1200° C.; and growing the resulting carbon by the thermal decomposition to a fibrous shape carbon starting from the transition metal. This type of hollow carbon fibril is sold as the trade name of "Graphite Fibril" manufactured by Hyperion Catalysis International, therefore it is easily available.

<Ethylene-Vinyl Alcohol Copolymer>

The ethylene-vinyl alcohol copolymer of component (F) used in the thermoplastic resin composition according to the present invention (hereinafter, it may be described as "F1") is a partial saponified product of ethylene-vinyl acetate copolymer whose saponification degree of vinyl acetate residue in the copolymer is not less than 97 mol %. The content of ethylene residue in the F1 is preferably 10 to 98 mol %, more preferably 20 to 70 mol %. When the content of ethylene residue thereof is more than 98 mol %, there may be deteriorated in the adhesion of painted film to the molded product obtained from the resin composition comprising the copolymer (F1). When the content of ethylene residue thereof is less than 10 mol %, the thermal stability of obtained resin composition may be insufficient and the softness thereof may be deteriorated.

<Partial Saponified Product of Ethylene-Vinyl Acetate Copolymer>

The partial saponified product of ethylene-vinyl acetate copolymer of component (F) used in the thermoplastic resin composition according to the present invention (hereinafter, it may be described as "F2") is a one having saponification degree of vinyl acetate residue in the ethylene-vinyl acetate copolymer of less than 97 mol %. There is no lower limit of saponification degree but usually, the saponification degree is not less than 40 mol %. When the saponification degree is less than 40 mol %, the thermal stability at the melting of the obtained thermoplastic resin composition tends to deteriorate. The saponification degree in F2 is preferably not less than 80 mol %.

F2 having such composition has an MFR of preferably 0.5 to 300 g/10 minutes, more preferably 0.8 to 250 g/10 minutes measured according to JIS-K6730 in view of melt fluidity and strength of resin composition containing F2.

The ethylene-vinyl alcohol copolymer of component (F1) and partial saponified product of ethylene-vinyl acetate copolymer of component (F2) (hereinafter, these are named generically as "F") may be copolymerized with the other monomer (compound), if necessary. Examples of copolymerizable monomer may include α-olefins such as propylene, isobutene, α-octene, α-dodecene and α-octadecene; unsaturated carboxylic acids, salts thereof, partial alkyl esters thereof, fully alkyl esters thereof and anhydrides thereof; acrylonitrile; acrylamide; and unsaturated sulphonic acid and salts thereof. The content of these optional monomer residue in the molecule of component (F) is usually not more than 10 mol %, preferably not more than 5 mol %.

<Assistant Agent for Conductivity Improvement>

The thermoplastic resin composition according to the present invention may contain an assistant agent for conductivity improvement (component (F)), if necessary. As the assistant agent for conductivity improvement (component (F)), there is concretely exemplified nigrosine (component (F1)), semi-aromatic polyamide resin (component (F2)), phenol novolac resin, lithium halide, or the like. Of these, nigrosine (F1) and semi-aromatic polyamide resin (F2) are preferred in view of good balance of rigidity and impact resistance.

The nigrosine (F1) which is one example of assistant agent for conductivity improvement (F) is a mixture of black azine-based condensate such as triphenazine oxazine and phenazine-based compounds, which are described in COLOR INDEX as C.I. SOLVENT BLACK5 or C.I. SOLVENT BLACK7. As the commercial available nigrosine, there are exemplified NUBIAN Black EP-3, NUBIAN Black PA-9800, NUBIAN Black PA0800 (all manufactured by Orient Chemical Industries, Ltd.). Of these, NUBIAN Black EP-3 is especially preferred because of attaining excellent conductivity improvement.

The content of nigrosine (F1) as the assistant agent for conductivity improvement (F) is selected within the range of 0.05 to 30 parts by weight based on 100 parts by weight of the component (A). When the content of nigrosine (F1) is less than 0.05 parts by weight, the effect of conductivity improvement is slight, when the content of nigrosine (F1) is more than 30 parts by weight, there may be problems of deterioration of thermal stability and heat resistance of final resin composition, deterioration of melt fluidity and deterioration of releasing property. The preferred range of nigrosine (F1) content is 0.1 to 20 parts by weight.

The semi-aromatic polyamide resin (F2) as the assistant agent for electroconductive improvement (F) is a polyamide resin obtained from polycondensation of aliphatic dicarboxylic acid and aromatic diamine, or aromatic dicarboxylic acid and aliphatic diamine as the materials. The concrete example of the aliphatic dicarboxylic acid as the material may include adipinic acid, glutalic acid, pymerinic acid, suberic acid, azelaic acid, sebacic acid, undecanedione acid, dodecadione acid, hexadecadione acid, hexadecenedione acid, eicosanedione acid, eicosadienedione acid, diglycol acid, 2,2,4-trimethyladipinic acid, 1,4-cyclohexane dicarboxylic acid, or the like. The concrete example of the aromatic diamine as the material may include m-xylene diamine and p-xylene diamine. The concrete example of the aromatic dicarboxylic acid as the material may include terephthalic acid, isophthalic acid and phthalic acid. The concrete example of the aliphatic diamine as the material may include hexamethylene diamine, tetramethylene diamine, nonamethylene diamine, undecamethylene diamine, dodecamethylene diamine, 2,2,4-(or 2,4,4-)trimethylhexamethylene diamine and bis-(4,4'-aminocyclohexyl)methane.

Of these semi-aromatic polyamide resin, polyamide resins comprising terephthalic acid and/or isophthalic acid and hexamethylene diamine as main components such as polyamide 6T, polyamide 6I and 6I/6T copolyamide, polyamide resins comprising m-xylene diamine and/or p-xylene diamine and adipinic acid as main components are especially preferred in view of attaining remarkable appearance improvement of molded product as well as effect of conductivity improvement.

The content of semi-aromatic polyamide resin (F2) as the assistant agent for conductivity improvement (F) is preferably selected within the range of 1 to 30 parts by weight based on 100 parts by weight of component (A). When the content of semi-aromatic polyamide resin (F2) is less than 1 part by weight, the effect of conductivity improvement is slight. When the content of semi-aromatic polyamide resin (F2) is more than 50 parts by weight, heat resistance, melt fluidity, releasability at the molding, or the like of the resin composition may be deteriorated. The more preferred content of semi-aromatic polyamide resin (F2) is 1 to 20 parts by weight.

<Thermoplastic Resin Composition>

The thermoplastic resin composition according to the present invention comprising the component (A): polyamide resin; the component (B): hydrogenated product of block copolymer comprising a vinyl aromatic polymer block (a) and a conjugated diene based polymer block (b), and/or ethylene-α-olefin based block copolymer; the component (C): modified hydrogenated product of block copolymer comprising the vinyl aromatic polymer block (a) and the conjugated diene based polymer block (b), which-hydrogenated product is modified by addition of an unsaturated acid and/or derivative thereof in an amount of 0.3 to 5.0 parts by weight based on 100 parts of hydrogenated product of block copolymer; and the component (D): plate-like and/or needle-like inorganic filler having an average particle size of not more than 8 μm. The weight ratio of component (A)/components ((B)+(C)) is 90/10 to 60/40, the weight ratio of component (B)/component (C) is 10/90 to 90/10, and amount of component (D) blended is 5 to 60 parts by weight based on 100 parts by weight of total amount of components (A), (B) and (C).

When the weight ratio of component (A) is more than 90 parts and the weight ratio of components ((B)+(C)) is less than 10 parts based on 100 parts by weight of total amount of component (A), (B) and (C), the impact resistance of the resin composition is deteriorated. On the other hand, the weight ratio of component (A) is less than 60 parts and the weight ratio of components ((B)+(C)) is more than 40 parts, the appearance, fluidity and dimension stability of resin composition are deteriorated.

When the weight ratio of component (B) is less than 10 parts by weight based on 100 parts by weight of total amount of component (B) and (C), the dimension stability is deteriorated. When the weight ratio of component (C) is less than 10 parts by weight, the impact resistance is deteriorated. Therefore, it is essential to use the components (B) and (C) together in the weight ratio of component (B)/component (C) being 10/90 to 90/10, preferably 50/50 to 90/10.

When the amount of component (D) blended is less than 5 parts by weight based on 100 parts by weight of total amount of component (A), (B) and (C), the dimension stability and rigidity (bending modulus) are deteriorated. When the amount of component (D) blended is more than 60 parts by weight, the fluidity, appearance and impact resistance are deteriorated. Thus, they are not preferable.

The amount of component (F) used in the resin composition of present invention: an ethylene-vinyl alcohol copolymer and/or a partial saponified product of ethylene-vinyl acetate copolymer, is 0.5 to 20 parts by weight based on 100 parts by weight of total amount of components (A), (B), (C) and (D). When the content of component (F) is less than 0.5 parts by weight, the effect of paint film adhesion property improvement in the molded product obtained from the polyamide resin composition according to the present invention is slight. When the content of component (F) is more than 20 parts by weight, the melt fluidity of the final resin composition is deteriorated caused by proceeding the reaction with the polyamide resin (A) and the modified hydrogenated product of block copolymer (C), and also the thermal stability at the melting stage is deteriorated. The content of component (F) is preferably 1 to 15 parts by weight, more preferably 2 to 10 parts by weight.

Further, in case where the thermoplastic resin composition according to the present invention contains the component (E): conductive carbon black and/or hollow carbon fibril, the content of component (F) is 0.5 to 20 parts by weight based on 100 parts by weight of total amount of components (A), (B), (C), (D) and (E).

Next, in case where the component (E): conductive carbon black and/or hollow carbon fibril is blended in order to impart the conductivity thereto, the content of component (E) is 1 to 15 parts by weight based on 100 parts by weight of the component (A). When the content of component (E) is less than 1 part by weight, the effect of conductivity improvement of thermoplastic resin composition is slight. When the content of component (E) is more than 15 parts by weight, the fluidity and impact resistance are deteriorated. Thus, they are not preferable.

In order to further improve the conductivity, the nigrosine or the semi-aromatic polyamide resin is preferably blended as the assistant agent for conductivity improvement (G). Further, by containing these components described as the assistant agent for conductivity improvement (G) into the composition, the appearance of the obtained molded product therefrom can be also improved.

In case of the thermoplastic resin composition containing the component (E) for imparting the conductivity, the content of component (F): ethylene-vinyl alcohol copolymer and/or partial saponified product of ethylene-vinyl acetate copolymer, is 0.5 to 20 parts by weight based on 100 parts by weight of total amount of components (A), (B), (C), (D) and (E). When the content of component (E) blended is less than 0.5 parts by weight, the improvement of adhesion property is slight. When the content of component (E) blended is more than 20 parts by weight, the fluidity thereof is deteriorated and also the thermal stability at the melting stage is deteriorated. In case of the composition containing the component (E), the content of component (F) blended is also preferably 1 to 15 parts by weight, more preferably 2 to 10 parts by weight.

As a process for producing the thermoplastic resin composition according to the present invention, a melt mixing method is preferably used. The typical melt mixing method is a method using a general melt kneader which is practically used. As the melt kneader, for example, mono axial or multi axial kneader extruder, roll, Bunbury mixer, or the like are mentioned.

In case of using the kneader extruder, a preferable method for producing a pellet of the thermoplastic resin composition comprises pre-mixing the components (A), (B) and (C) to obtain a mixture, feeding the mixture collectively into the upper stream portion of the kneeder extruder, reacting them at the melting condition, successively feeding the component (D) into the middle stream portion of the kneeder extruder to mix with the reaction mixture, and further if required, feeding the component (E) into the down stream portion of the kneeder extruder and mixing it with the melting mixture to obtain a pellet of thermoplastic resin composition.

The other method for producing a pellet of the thermoplastic resin composition comprises pre-mixing the components (A), (B) and (C) to obtain a mixture, feeding the mixture collectively into the kneeder extruder, reacting them at the melting condition to obtain a pellet, then feeding the obtained pellet with the component (D) into the kneeder extruder to react the component (D) with the reaction mixture of components (A) to (C), and further if required, feeding the component (E) into the down stream portion of the kneeder extruder and mixing it with the melting reaction mixture to obtain a pellet of thermoplastic resin composition.

Further, the other method for producing a pellet of the thermoplastic resin composition comprises pre-mixing a partial or full melting reaction product of the component (A) and the component (E) to prepare a masterbatch, mixing the masterbatch and the components (A), (B) and (C) to obtain a mixture, feeding the mixture into the kneeder extruder, reacting them at the melting condition, then feeding the component (D) into the middle portion of kneeding extruder to mix the component (D) with the melting reaction mixture of components (A) to (C) and to obtain a pellet of thermoplastic resin composition; or mixing the above obtained masterbatch with the components (A), (B) and (C) to obtain a mixture, feeding the mixture into the kneeder extruder, reacting them at the melting condition to obtain a pellet, then feeding the obtained pellet and the component (D) into the kneeder extruder to react the component (D) with the melting reaction mixture, to obtain a pellet of thermoplastic resin composition.

As described above, by previously melt reacting the components (A), (B) and (C), there can be preferably obtained a resin composition excellent in impact resistance, dimension stability (linear expansion coefficient), rigidity and appearance.

In the thermoplastic resin composition according to the present invention, various additives for resin other than the above components may be contained. Examples of the additives for resin may include thermal stabilizer, antioxidant, weather resistance improver, nucleating agent, foaming agent, flame retardant, impact resistance improver, lubricant, plasticizer, fluidity improver, dye, pigment, organic filler, reinforcing agent, disperser, or the like. Further, it is effective to improve the rigidity, heat resistance and size accuracy by containing a liquid crystal polymer thereinto.

A method for producing the molded product from the thermoplastic resin composition according to the present invention is not specified and generally used molding methods for thermoplastic resins such as injection molding, blow molding, extrusion molding, sheet molding, thermoforming, rotational molding, lamination molding, press molding, or the like may be used.

The thermoplastic resin composition according to the present invention may be used as production materials for widely industry fields such as electric equipment parts, electronic equipment parts, automobile parts, or the like. Especially the thermoplastic resin composition is useful as production materials for automobile exterior parts.

EXAMPLES

The present invention is described in more detail below by the following examples, but these examples are only illustrative and not intended to limit the scope of the present invention. In the following descriptions of the Examples and the Comparative Examples, all "parts" are "parts by weight" unless otherwise noted.

The following materials are prepared for producing each resin composition in Examples and Comparative Examples.

1. Component (A): Polyamide Resin

Nylon-6: NOVAMID 1010J manufactured by Mitsubishi Engineering-Plastics Corporation, relative viscosity in 1 wt % of 98% concentrate sulfuric acid solution at 23° C.=2.5, ratio of end carboxyl group/end amino group=2.6 (hereinafter, abbreviated as PA6-1).

2. Component (B): Hydrogenated Product of Block Copolymer Comprising an Ethylene-α-olefin Based Block Copolymer Styrene-ethylene/butylene-styrene copolymer (SEBS): Kraton G1652 manufactured by Kraton Polymers LLC, styrene content=29 wt %, number average molecular weight=49,000 (hereinafter, abbreviated as SEBS).

Ethylene-butene copolymer: TAFMER A-4085 manufactured by Mitsui Chemicals, Inc., MFR according to ASTM-D1238 measured at 230° C. under load of 2.16 kg=6.7 g/min (hereinafter, abbreviated as EBR).

3. Component (C): Modified Hydrogenated Product of Block Copolymer

<Preparation of Modified Hydrogenated Product of Block Copolymer>

100 parts by weight of SEBS, 2.5 parts by weight of maleic anhydride and 0.5 parts by weight of radical generator were weighed and mixed uniformly by use of a Henschel Mixer, and melt reacted by use of a twin screw extruder (TEX-30XCT manufactured by Japan Steel Works, LTD., screw size=30 mm, L/D=42, barrel number=12) at 230° C. of cylinder temperature under 300 rpm of screw revolution number, to obtain a modified hydrogenated product of block copolymer C-1. As the maleic anhydride, a maleic anhydride manufactured by Mitsubishi Chemical Corporation was used. As the radical generator, 1,3-bis(2-t-butylperoxyisopropyl)benzene (trade name: Perkadox 14 manufactured by Kayaku Akzo Corporation, half-life temperature for 10 hours: 121° C.) was used.

After the thus obtained modified hydrogenated product of block copolymer was heat-dried under reduced pressure, a maleic anhydride amount in addition reaction was measured by titration with sodium methylate. The added maleic anhydride was 1.2 wt %.

4. Component (D): Inorganic Filler

Magnesium silicate (talc): Hi-filler #5000PJ manufacture by Matsumura Sangyo Co., Ltd., average particle size=1.8 μm, average aspect ratio=6, plate-like crystal (hereinafter, abbreviated as D-1).

Calcium silicate (Wollastonite): PH450 manufacture by Kawatetsu Mineral Co., Ltd., average particle size=3.8 μm, length=19 μm, average aspect ratio=7, needle-like crystal (hereinafter, abbreviated as D-2).

Calcium silicate (Wollastonite) used for Comparative Examples: KH15 manufacture by Kawatetsu Mineral Co., Ltd., average particle size=9.6 μm, length=83 μm, average aspect ratio=10, needle-like crystal (hereinafter, abbreviated as D-3).

Glass fiber used for Comparative Examples: JA FT516 manufacture by Asahi Fiber-Glass Co., Ltd., diameter=10 μm, length=3 mm, fibrous material (hereinafter, abbreviated as D-4).

5. Component (E): Conductive Carbon Black and/or Hollow Carbon Fibril

Conductive carbon black: Ketchen black EC600JD manufactured by Lion Corporation, specific surface area measured by BET method=1270 m$^2$/g, DBP absorption=495 ml/100 g (hereinafter, abbreviated as CB).

6. Component (F): Ethylene-Vinyl Alcohol Resin (F-1) EVOH G156A: ethylene-vinyl alcohol resin (Eval G156A manufactured by KURARAY CO., LTD., ethylene copolymerized ratio=47 mol %), density=1.12, MFR (JIS K6730, temperature=190° C., load=2.16 kg)=6 g/10 min.

(F-2) EVOH C109: ethylene-vinyl alcohol resin (Eval C109 manufactured by KURARAY CO., LTD., ethylene copolymerized ratio=35 mol %), density=1.17 g/cm$^3$, MFR (measured under the same condition to (F-1))=8 g/10 min.

(F-3) EVOH H6960: partial saponified product of ethylene-vinyl acetate copolymer, (Melthene H6960 manufactured by Tosoh Corporation), density=0.99 g/cm$^3$, MFR (measured under the same condition to (F-1))=40 g/10 min, melting point=113° C., content of vinyl acetate=4.2 wt %, degree of saponification=90%.

7. Component (G): Assistant Agent for Conductivity Improvement (G-1) NIGROSINE EP-3: (black azine-based dye, NUBIAN Black EP-3 manufactured by Orient Chemical Industries, Ltd.).

(G-2) X21F07: Semi-aromatic polyamide resin (copolyamide resin 6I/6T, NOVAMIDE X21F07 manufactured by Mitsubishi Engineering-Plastics Corporation)

8. Others:

(H-1) YD5013: Bisphenol type epoxy compound (EPO-TOHTO YD5013 manufactured by Tohto Kasei Co., Ltd).

(H-2) AC5120: Ethylene-acrylic acid copolymer (AC WAX 5120 manufactured by Honeywell International Inc., acrylic acid content=9.2 wt %).

<Preparation of Test Specimen>

The thermoplastic resin composition was injection-molded by use of an injection molding machine (IS150 manufactured by TOSHIBA MACHINE CO., LTD.) under such conditions of cylinder temperature of 280° C. and mold temperature of 80° C. to prepare a disk shape molded product having a size of 100 mmφ×3 mmt for an ASTM test specimen and a square shape molded product having a size of 100×100 mm×3 mmt for evaluation of paint film adhesion property.

<Evaluation Methods>

(1) Fluidity (MFR):

MFR (unit: g/10 min) was measured according to JIS K7210 at a temperature of 280° C. under load of 5 kg.

(2) Bending Modulus:

Bending modulus (unit: MPa) was measured according to ASTM D790.

(3) Impact Resistance (Surface Impact)

The prepared 100 mmφ disc shape sheet (thickness: 3 mmt) was subjected to a piercing test by use of a high rate impact testing machine manufactured by Shimadzu Corporation under such conditions of punch diameter of ½ inches, support diameter of 3 inches and piercing speed of 1 m/s. Larger break energy (unit: J), more excellent impact resistance.

(4) Dimension Stability (Linear Expansion Coefficient)

Linear expansion coefficient (unit: K$^{-1}$) was measured according to ASTM D696. The measurement temperature is within a range of 23 to 80° C.

(5) Appearance:

The surface appearance of disc shape molded product was observed by naked eye and evaluated whether there was a poor appearance such as marks caused by insufficient releasing and silver streaks. When there was such poor appearance, the evaluation was "Poor", and when there was no such poor appearance, the evaluation was "Good", (6) Volume Resistivity:

The both edge parts of ASTM2 type dumbbell shape test specimen (thickness: 3 mm) was cut so that the length of parallel portion was 50 mm. Silver paste was coated onto the all surface of new edge portions by cutting and dried at room temperature. After drying, the resistivity (RL, unit: Ω) between the both edge surfaces was measured by use of a tester and the volume resistivity R (unit: Ωcm) was calculated by the following formula.

$$R = RL \times AL/L$$

Where in the formula, AL is the cross sectional area of test specimen (unit: cm$^2$) and L is the length of test specimen (unit: cm).

(7) Paint Film Adhesion Property (%)

A plate-like square test piece composed of the composition and having a size of 100 mm×100 mm and thickness of 3 mm was prepared. First, an acrylic/urethane-based paint ("OP-Z-NY" manufactured by Origin Electric Co., Ltd.) was applied on the test piece surface and cured at 80° C. for 60 minutes. Next, 100 square slits cross each other having width of 1 mm were stamped on the surface of cured paint. A Cellophane adhesive tape was pasted on the stamped paint surface and then peeled off, and then it was confirmed by naked eye whether the paint surface was peeled off together with the Cellophane adhesive tape or not. The paint film adhesion property was evaluated by counting the number of paints square slits which were not peeled off by the Cellophane adhesive tape and remained on the test piece and represented as the remaining ratio (%) of paints square slits. The larger remaining ratio, the more excellent in the paint film adhesion property.

Process for Producing Resin Compositions in Examples and Comparative Examples

Examples 1 to 5

First, the components (A), (B) and (C) were fed into a tumbler mixer and mixed therewith to prepare a mixture. The mixture was fed into a twin extruder ("TEX-30XCT" manufactured by Japan Steel Works, Ltd., L/D=42, barrel number: 12) at the first barrel thereof and melt-kneaded under the condition of the cylinder temperature of 230° C. and the screw rotational speed of 400 rpm, to obtain pellets.

Next, the component (D) was blended into the obtained melt-kneaded product, mixed in the tumbler mixer and melt-kneaded under the same condition to the above to obtain pellets comprising the components (A), (B), (C) and (D).

Next, the obtained melt-kneaded pellets comprising the components (A), (B), (C) and (D) were mixed with the component (F) in the tumbler mixer to obtain a dry blend product and this product was used for molding and evaluation. The results are shown in Table 1.

Example 6

The same procedure as defined in Example 1 was conducted except that the component (E) was side-fed at the fifth barrel when melt-kneeding the components (A), (B) and (C) to obtain a dry blend product. The results are shown in Table 1.

Examples 7 to 8

The same procedure as defined in Example 6 was conducted except that the component (G) was also fed together when mixing the components (A), (B) and (C) in the tumbler mixer to obtain a dry blend product. The results are shown in Table 1.

Comparative Example 1

The same procedure as defined in Example 1 was conducted except for blending no component (F) to obtain a dry blend product. The results are shown in Table 1.

Comparative Example 2

The same procedure as defined in Example 1 was conducted except that the component (H) was blended at the same stage of blending the component (D) and no component (F) was blended to obtain a dry blend product. The results are shown in Table 1.

Comparative Examples 3 to 4

The same procedure as defined in Example 6 was conducted except that the component (H) was blended at the same stage of blending the component (D) and no component (F) was blended to obtain a dry blend product. The results are shown in Table 1.

TABLE 1

| | Example | | | |
|---|---|---|---|---|
| | 1 | 2 | 3 | 4 |
| (A) Polyamide resin (kind)/Blending amount (wt parts) | PA6-1 75 | PA6-1 75 | PA6-1 75 | PA6-1 75 |
| (B) Hydrogenated product of block copolymer (kind)/Blending amount (wt parts) | SEBS 15 | EBR 15 | SEBS 15 | SEBS 15 |
| (C) Modified block copolymer (kind)/Blending amount (wt parts) | C-1 10 | C-1 10 | C-1 10 | C-1 10 |
| (D) Inorganic filler (kind)/Blending amount (wt parts) | D-1 30 | D-1 30 | D-2 30 | D-1 30 |
| (E) Conductive agent (kind)/Blending amount (wt parts) | — — | — — | — — | — — |
| (F) EVOH (kind)/Blending amount (wt parts) | F-1 2.5 | F-1 2.5 | F-1 2.5 | F-2 2.5 |
| (G) Assistant agent for conductivity improvement (kind)/Blending amount (wt parts) | — — | — — | — — | — — |
| (H) Other component (kind)/Blending amount (wt parts) | — — | — — | — — | — — |
| MFR (g/10 min) | 50 | 47 | 63 | 50 |
| Bending modulus (MPa) | 3650 | 3580 | 4350 | 3650 |
| Surface impact resistance (break energy) (J) | 58 | 55 | 62 | 58 |
| Linear expansion coefficient ($10^{-5}K^{-1}$) | 7.3 | 7.4 | 4.9 | 7.3 |
| Volume resistivity (Ωcm) | $10^{12}\leq$ | $10^{12}\leq$ | $10^{12}\leq$ | $10^{12}\leq$ |
| Appearance | Good | Good | Good | Good |
| Paint film adhesion property (%) | 100 | 100 | 100 | 100 |

TABLE 2

| | Example | | | |
|---|---|---|---|---|
| | 5 | 6 | 7 | 8 |
| (A) Polyamide resin (kind)/Blending amount (wt parts) | PA6-1 75 | PA6-1 75 | PA6-1 75 | PA6-1 75 |
| (B) Hydrogenated product of block copolymer (kind)/Blending amount (wt parts) | SEBS 15 | SEBS 15 | SEBS 15 | SEBS 15 |
| (C) Modified block copolymer (kind)/Blending amount (wt parts) | C-1 10 | C-1 10 | C-1 10 | C-1 10 |
| (D) Inorganic filler (kind)/Blending amount (wt parts) | D-1 30 | D-1 30 | D-1 30 | D-1 30 |
| (E) Conductive agent (kind)/Blending amount (wt parts) | — — | CB 4 | CB 4 | CB 4 |
| (F) EVOH (kind)/Blending amount (wt parts) | F-3 2.5 | F-1 2.5 | F-1 2.5 | F-1 2.5 |
| (G) Assistant agent for conductivity improvement (kind)/Blending amount (wt parts) | — — | — — | G-1 0.3 | G-2 5 |
| (H) Other component (kind)/Blending amount (wt parts) | — — | — — | — — | — — |
| MFR (g/10 min) | 55 | 21 | 21 | 20 |
| Bending modulus (MPa) | 3640 | 3750 | 3750 | 3800 |
| Surface impact resistance (break energy) (J) | 55 | 34 | 34 | 36 |
| Linear expansion coefficient ($10^{-5}K^{-1}$) | 7.2 | 7.1 | 7.1 | 7.0 |
| Volume resistivity (Ωcm) | $10^{12}\leq$ | $9 \times 10^4$ | $1 \times 10^4$ | $1 \times 10^4$ |
| Appearance | Good | Good | Good | Good |
| Paint film adhesion property (%) | 100 | 100 | 100 | 100 |

TABLE 3

| | Comparative Example | | | |
|---|---|---|---|---|
| | 1 | 2 | 3 | 4 |
| (A) Polyamide resin (kind)/Blending amount (wt parts) | PA6-1 75 | PA6-1 75 | PA6-1 75 | PA6-1 75 |
| (B) Hydrogenated product of block copolymer (kind)/Blending amount (wt parts) | SEBS 15 | SEBS 15 | SEBS 15 | SEBS 15 |
| (C) Modified block copolymer (kind)/Blending amount (wt parts) | C-1 10 | C-1 10 | C-1 10 | C-1 10 |
| (D) Inorganic filler (kind)/Blending amount (wt parts) | D-1 30 | D-1 30 | D-1 30 | D-1 30 |
| (E) Conductive agent (kind)/Blending amount (wt parts) | — — | — — | CB 4 | CB 4 |
| (F) EVOH (kind)/Blending amount (wt parts) | — — | — — | — — | — — |
| (G) Assistant agent for conductivity improvement (kind)/Blending amount (wt parts) | — — | — — | — — | — — |
| (H) Other component (kind)/Blending amount (wt parts) | — — | H-1 2 | H-1 2 | H-2 2 |
| MFR (g/10 min) | 50 | 25 | 8 | 26 |
| Bending modulus (MPa) | 3650 | 3450 | 3750 | 3210 |
| Surface impact resistance (break energy) (J) | 58 | 48 | 28 | 28 |
| Linear expansion coefficient ($10^{-5}K^{-1}$) | 7.3 | 7.3 | 7.1 | 7.7 |
| Volume resistivity (Ωcm) | $10^{12}\leq$ | $10^{12}\leq$ | $4 \times 10^5$ | $9 \times 10^4$ |
| Appearance | Good | Poor | Poor | Poor |
| Paint film adhesion property (%) | 0 | 100 | 100 | 50 |

Evaluation Results of Composition Quality in the Above Examples and Comparative Examples:

The evaluation results of the compositions obtained by the above manners are set forth below.

Comparing Examples 1 to 5 with Comparative Examples 1 to 2

As seen from the above, the compositions in Examples 1 to 5 are excellent in the paint film adhesion property while maintaining the excellent rigidity, impact resistance, dimension stability and appearance in comparison with the compositions in Comparative Examples 1 to 2 blending no component (F).

Comparing Example 6 with Comparative Examples 3 to 4

As seen from the above, the composition in Example 6 is excellent in the appearance in comparison with the compositions in Comparative Examples 3 to 4 blending the component (H) instead of the component (F).

Especially, the composition in Example 6 is also excellent in the fluidity, impact resistance and conductivity in comparison with the composition in Comparative Example 3 blending the component (H-1), further, also excellent in the rigidity, dimension stability, impact resistance and paint film adhesion property in comparison with the composition in Comparative Example 4 blending the component (H-2).

Comparing Example 6 with Examples 7 to 8

As seen from the above, the compositions in Examples 7 to 8, in which the component (G) were further blended into the composition in Example 6, are further improved in the conductivity in comparison with the compositions in Example 6.

Since the thermoplastic resin composition according to the present invention is excellent in balance of impact resistance, dimension stability and rigidity, and also excellent in appearance, it is widely used for various technical fields such as electric machine parts, electronics parts, machine parts and automobile parts, especially extremely useful as manufacturing materials for exterior parts of automobile. Further, since the thermoplastic resin composition according to the present invention is excellent in conductivity and paint film adhesion property, it is especially effective to conduct electrostatic painting to large-scale molding products comprising the composition.

What is claimed is:

1. A thermoplastic resin composition comprising
component (A): a polyamide resin;
component (B): a hydrogenated product of block copolymer comprising vinyl aromatic polymer block (a) and conjugated diene based polymer block (b), and/or an ethylene-α-olefin based block copolymer;
component (C): a modified hydrogenated product of block copolymer comprising the vinyl aromatic polymer block (a) and the conjugated diene based polymer block (b), which hydrogenated product is modified by addition of an unsaturated acid and/or derivative thereof in an amount of 0.3 to 2.5 parts by weight based on 100 parts of hydrogenated product of block copolymer;
component (D): a plate-like and/or needle-like inorganic filler having an average particle size of not more than 8 μm; and
component (F): an ethylene-vinyl alcohol copolymer and/or a partial saponified product of ethylene-vinyl acetate copolymer,
a weight ratio of component (A)/components ((B)+(C)) being 90/10 to 60/40,
a weight ratio of component (B)/component (C) being 10/90 to 90/10,
an amount of component (D) being 5 to 60 parts by weight based on 100 parts by weight of total amount of components (A), (B) and (C), and
an amount of component (F) being 0.5 to 20 parts by weight based on 100 parts by weight of total amount of components (A), (B), (C), and (D).

2. A thermoplastic resin composition according to claim 1, wherein the hydrogenated product of block copolymer in the component (B) and component (C) has an (a)-(b)-(a) type triblock structure where (a) is the vinyl aromatic polymer block (a) and (b) is the conjugated diene based polymer block (b).

3. A thermoplastic resin composition according to claim 1, wherein the component (C) is a modified hydrogenated product of block copolymer obtained by the addition of unsaturated acid and/or derivative thereof in the presence of a radical generation agent.

4. A thermoplastic resin composition according to claim 1, wherein the component (A) is such a polyamide resin that a relative viscosity of 1 wt % solution thereof in 98 wt % concentrated sulfuric acid at 23° C. is 2.1 to 3.5 and a ratio of terminal carboxyl group content/terminal amino group content is 0.8 to 4.

5. A thermoplastic resin composition according to claim 1, wherein the average particle size of component (D) is not more than 5 μm.

6. A thermoplastic resin composition according to claim 1, wherein the average particle size of component (D) is not more than 3.5 μm.

7. A thermoplastic resin composition according to claim 1, wherein the thermoplastic resin composition is produced by prior melt-reacting with the components (A), (B) and (C) to obtain a melt reaction product, blending and kneading the component (D) into the melt reaction product to obtain a melt kneading product comprising the components (A), (B), (C) and (D), and dry blending the component (F) into the melt kneeding product.

8. A thermoplastic resin composition according to claim 1, wherein a component (G1) of nigrosine is further blended in an amount of 0.05 to 30 parts by weight based on 100 parts by weight of component (A).

9. A thermoplastic resin composition according to claim 1, wherein a component (G2) of semi-aromatic polyamide resin is further blended in an amount of 1 to 30 parts by weight based on 100 parts by weight of component (A).

10. A thermoplastic resin composition comprising
component (A): a polyamide resin;
component (B): a hydrogenated product of block copolymer comprising vinyl aromatic polymer block (a) and conjugated diene based polymer block (b), and/or ethylene-α-olefin based block copolymer;
component (C): a modified hydrogenated product of block copolymer comprising the vinyl aromatic polymer block (a) and the conjugated diene based polymer block (b), which hydrogenated product is modified by addition of an unsaturated acid and/or derivative thereof in an amount of 0.3 to 2.5 parts by weight based on 100 parts by weight of hydrogenated product of block copolymer;

component (D): a plate-like and/or needle-like inorganic filler having an average particle size of not more than 8 μm;

component (E): a conductive carbon black and/or hollow carbon fibril; and component (F): an ethylene-vinyl alcohol copolymer and/or a partial saponified product of ethylene-vinyl acetate copolymer, a weight ratio of component (A)/components ((B)+(C)) being 90/10 to 60/40, a weight ratio of component (B)/component (C) being 10/90 to 90/10, an amount of component (D) being 5 to 60 parts by weight based on 100 parts by weight of total amount of components (A), (B) and (C), an amount of component (E) being 1 to 15 parts by weight based on 100 parts by weight of component (A), and an amount of component (F) being 0.5 to 20 parts by weight based on 100 parts by weight of total amount of components (A), (B), (C), (D) and (E).

11. A thermoplastic resin composition according to claim 10, wherein the hydrogenated product of block copolymer in the component (B) and component (C) has an (a)-(b)-(a) type triblock structure where (a) is the vinyl aromatic polymer block (a) and (b) is the conjugated diene based polymer block (b).

12. A thermoplastic resin composition according to claim 10, wherein component (C) is a modified hydrogenated product of block copolymer obtained by the addition of unsaturated acid and/or derivative thereof in the presence of a radical generation agent.

13. A thermoplastic resin composition according to claim 10, wherein the component (A) is such a polyamide resin that a relative viscosity of 1 wt % solution thereof in 98 wt % concentrated sulfuric acid at 23° C. is 2.1 to 3.5 and a ratio of terminal carboxyl group content/terminal amino group content is 0.8 to 4.

14. A thermoplastic resin composition according to claim 10, wherein the average particle size of component (D) is not more than 5 μm.

15. A thermoplastic resin composition according to claim 10, wherein the component (D) is a calcium silicate and/or magnesium silicate.

16. A thermoplastic resin composition according to claim 10, wherein the average particle size of component (D) is not more than 3.5 μm.

17. A thermoplastic resin composition according to claim 10, wherein the component (E) is a carbon black whose dibutylphthalate oil absorption is not less than 200 ml/100 g.

18. A thermoplastic resin composition according to claim 10, wherein the thermoplastic resin composition is produced by prior melt-kneading the components (A) and (E) to obtain a melt kneading product, adding the components (B) and (C) into the melt kneading product and melt-reacting to obtain a melt reaction product, and blending and kneading the component (D) into the melt reaction product.

19. A thermoplastic resin composition according to claim 10, wherein the thermoplastic resin composition is produced by prior melt-reacting with the components (A), (B) and (C) to obtain a melt reaction product, blending and kneading the components (D) and (E) into the melt reaction product to obtain a melt kneading product, and dry blending the component (F) into the melt kneading product.

20. A thermoplastic resin composition according to claim 10, wherein a component (G1) of nigrosine is further blended in an amount of 0.05 to 30 parts by weight based on 100 parts by weight of component (A).

21. A thermoplastic resin composition according to claim 10, wherein a component (G2) of semi-aromatic polyamide resin is further blended in an amount of 1 to 30 parts by weight based on 100 parts by weight of component (A).

22. A thermoplastic resin composition comprising component (A): a polyamide resin;

component (B): a hydrogenated product of block copolymer comprising vinyl aromatic polymer block (a) and conjugated diene based polymer block (b), and/or an ethylene-a-olefin based block copolymer;

component (C): a modified hydrogenated product of block copolymer comprising the vinyl aromatic polymer block (a) and the conjugated diene based polymer block (b), which hydrogenated product is modified by addition of an unsaturated acid and/or derivative thereof in an amount of 0.3 to 2.5 parts by weight based on 100 parts of hydrogenated product of block copolymer;

component (D): a calcium silicate and/or magnesium silicate having an average particle size of not more than 8 μm; and component (F): an ethylene-vinyl alcohol copolymer and/or a partial saponified product of ethylene-vinyl acetate copolymer, a weight ratio of component (A)/components ((B)+(C)) being 90/10 to 60/40, a weight ratio of component (B)/component (C) being 10/90 to 90/10, an amount of component (D) being 5 to 60 parts by weight based on 100 parts by weight of total amount of components (A), (B) and (C), and an amount of component (F) being 0.5 to 20 parts by weight based on 100 parts by weight of total amount of components (A), (B), (C), and (D).

* * * * *